United States Patent Office

3,832,218
Patented Aug. 27, 1974

---

3,832,218
LIGHT-INTERCEPTING PAPER FOR PHOTOGRAPHIC FILM
Yoshihiro Seto, Minami-ashigara, Japan, assignor to Fuji Photo Film Co., Ltd., Kanagawa, Japan
Filed July 25, 1972, Ser. No. 275,004
Claims priority, application Japan, July 27, 1971, 46/56,138
Int. Cl. D21h 1/28; G03c 3/02
U.S. Cl. 117—76 P                    4 Claims

ABSTRACT OF THE DISCLOSURE

A light-intercepting paper for a photographic film comprising a paper having on at least one side of said paper a light-intercepting layer comprising carbon black dispersed in a copolymer of ethylene and at least one ester selected from the group consisting of acrylic esters, methacrylic esters and mixtures thereof, wherein the alkyl moiety of said esters has from 1 to 8 carbon atoms, and wherein said copolymer has a copylymerization molar ratio of said esters to ethylene of from 5:95 to 40:60 is disclosed.

Figure 1:
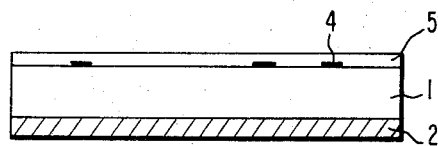

BACKGROUND OF THE INVENTION (1) Field of the Invention

The present invention relates to a light-intercepting paper for photographic film and, more particularly, the present invention relates to a light-intercepting paper having improved pliability and which can be used for a photographic roll film.

(2) Description of the Prior Art

Usually, a light-intercepting paper is prepared from a black-colored paper, a paper containing a colored paper layer, or a paper having no or an insufficient light- property coated with a light-intercepting layer, which are additionally provided with functionally necessary letters or marks, or printings intended to increase the commercial value thereof. If necessary, protective layers may be provided on the one side or both sides thereof.

For the light-intercepting papers, there are a variety of embodiments such as a packing paper for photographic light-sensitive materials, light-intercepting wound paper used for the backing of a photographic roll film, and the like. This type of light-intercepting paper is superposed on a photographic film of a specific length and wound on a film-winding core, or, when the core is not used, it is wound and loaded in a cavity of a specific space which can be used. For such purposes, naturally there exists an upper limit in the thickness of the light-intercepting paper since the length of the light-intercepting paper is predetermined by the length of the photographic film or the loading cavity.

For example, as an example described in U.S. Pat. No. 3,138,084 referred to as "126 cartridge" among those skilled in the art, a photographic film for taking pictures is loaded in a magazine and, since the photographic film is not completely retained in place due to an aperture provided on the exposure portion of the magazine, it is necessary to provide the light-intercepting paper with such a thickness that it can provide an enough let-off rate of the light-intercepting paper so as to prevent a slack or waviness in the photographic film due to the difference in the running rate between the photographic film and the light-intercepting paper at the aperture when the assembly of the photographic film and the light-intercepting paper runs from a let-off magazine toward a winding-up magazine.

In addition, in the case of winding the photographic film superposed on the light-intercepting paper, it is also necessary for the light-intercepting paper to be sufficiently pliable so that the light-intercepting paper can adhere closely to the winding core and the photographic film to thereby increase the light-intercepting capability.

Production of the light-intercepting paper by applying a light-intercepting layer to a paper has widely been conducted so far, considering the conditions, restrictions and necessary functions required for such light-intercepting papers.

The simplest process, as described, for example, in British Pat. No. 1,071,032 or French Pat. No. 1,449,852, comprises incorporating a suitable amount of pigment having light-intercepting property in a thermoplastic resin such as polyethylene and finally conducting a heat melting extrusion coating.

However, when polyethylene is employed as a material for a light-intercepting layer as in the above-described process, various disadvantages tend to occur due to the lack of pliability of the light-intercepting paper. Therefore, materials which are more pliable than polyethylene have been required.

SUMMARY OF THE INVENTION

As the result of extensive searching for materials having the above-described various characteristics required of the light-intercepting paper, the present invention has been achieved.

That is, the present invention relates to a light-intercepting paper for photographic films wherein at least one side of a paper is provided with the layer prepared by dispersing carbon black in a copolymer of at least either an acrylic ester or a methacrylic ester and ethylene in which the alkyl moiety of the ester has from 1 to 8 carbon atoms, and in which the copolymerization molar ratio of the ester to ethylene ranges from 5:95 to 40:60.

BRIEF DESCRIPTION OF THE ACCOMPANYING DRAWINGS

The figures are cross sectional views of various embodiments of light-intercepting papers for photographic films in accordance with the invention. In the figures, 1 designates a paper, 2 is a light-intercepting layer, 3 is an adhesive layer, 4 is a printing (ink) and 5 is a protective layer.

DETAILED DESCRIPTION OF THE INVENTION

The copolymers which are suitable for use in the invention are, as the comonomer, acrylic esters, such as methyl acrylate, ethyl acrylate, n-propyl acrylate, iso-propyl acrylate, n-butyl acrylate, iso-butyl acrylate, n-hexylacrylate, 2-ethylhexyl acrylate, n-octyl acrylate, etc. and methacrylic esters, such as methyl methacrylate, ethyl methacrylate, n-propyl methacrylate, isopropyl methacrylate, n-butyl methacrylate, iso-butyl methacrylate, n-hexyl methacrylate, 2-ethylhexyl methacrylate, n-octyl methacrylate, etc.

The acrylic esters and methacrylic esters are those esters formed by alkyl groups having from 1 to 8 carbon atoms. Some of the copolymers are commercially available or they can be prepared by copolymerizing at least one ester selected from the group consisting of acrylic esters and methacrylic esters or mixtures thereof with ethylene within a copolymerization molar ratio of these esters to ethylene ranging from 5:95 to 40:60 using conventional known techniques. A suitable molecular weight range for these copolymers is from about 20,000 to 50,000 or an average degree of polymerization from about 1,000 to 2,000.

In the invention, carbon black is dispersed in the copolymer described above. The carbon black preferably has a mean grain size of less than 50 m$\mu$ and is preferably in an amount of from 5 to 50 parts by weight per 100 parts by weight of the copolymer. If the amount of the carbon black incorporated is too small, the light-intercepting property becomes poor and the effect of static electricity occurs, while if the amount is too great, the resulting layer becomes brittle and the pliability thereof is lowered.

When, for example, a copolymer of a methacrylic ester is used, surface active agents such as sorbitan monooleate, sorbitan sesquioleate, sorbitan mono-stearate, polyoxyethylene alkyl ether, polyoxyethylene alkylaryl ether, etc., various waxes, or dispersing agents such as low molecular weight polyethylene, etc. may preferably be added to the light-intercepting layer, since the dispersing properties of this copolymer tends to be somewhat poor.

The amount of the above-described additives to be added varies widely depending upon the dispersing agent used, but, generally speaking, an amount of these materials within about 10 parts by weight per 100 parts by weight of the light-intercepting layer is sufficient to produce the effect desired.

The light-intercepting layer has preferably a thickness of from 10 to $40\mu$. If the layer is thinner than about $10\mu$, a stable film thereof is difficult to prepare, while if the layer is thicker than $40\mu$, the layer is unsuitable since too great a thickness as a light-intercepting paper of the invention results.

As the paper to be used as a support, those prepared from kraft pulp, sulfite pulp or mixtures thereof and weighing from 40 to 100 g./m.$^2$, which do not exert any photographic effects, are preferable. Papers of less than 40 g./m.$^2$ in weight lack physical strength, while papers of above 100 g./m.$^2$ in weight have such an increased rigidity that such papers are unsuitable as a light intercepting paper.

It is preferable to use a transparent ethylene polymer, a hot-melt type adhesive, a solvent type adhesive, etc., for the adhesion between the support and the light-intercepting layer. Suitable examples of such adhesives are ethylene polymers, such as a low density polyethylene produced by the high-pressure process (density: 0.915–0.930) and the ethylene copolymers described herein; solvent-type adhesives, such as polyisobutylene, butyl gum, hydrogenated polybutadiene, styrene-butadiene block copolymer and the like, and hot-melt type adhesives such as a mixture of an ethylene copolymer and wax as disclosed in U.S. Pat. No. 3,496,062.

As was described above, the light-intercepting paper of the invention can be embodied in various forms. Representative constitutions thereof are illustrated in FIGS. 1 to 4 of the accompanying drawings, where 1 designates a paper, 2 is a light-intercepting layer in accordance with the invention, 3 is an adhesive layer used if necessary, 4 in printing (ink), 5 is a protective layer, and, if necessary, paper 1 comprises an uncolored paper layer 11 and a colored paper layer 12.

FIG. 1 shows a light-intercepting paper prepared by applying a light-intercepting layer 2 to one side of paper 1, and applying printing 4 then a protective layer 5 to the other side thereof.

Figure 2:
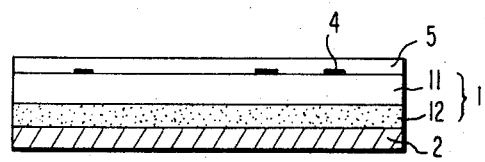

FIG. 2 shows a light-intercepting paper prepared in the same manner as described in FIG. 1 except that a paper comprising an uncolored paper 11 and a colored paper 12 is used.

Figure 3:
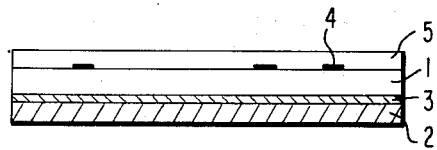

FIG. 3 shows a light-intercepting paper prepared by applying an adhesive layer 3 to paper 1, superposing and sticking a specially molded light-intercepting layer 2 on the adhesive layer 3 and, after applying printing 4 to the other side of the paper 1, applying a protective layer 5.

Figure 4:
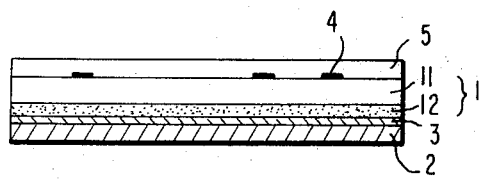

FIG. 4 shows a light-intercepting paper prepared in the same manner as described in FIG. 3 except that a paper 1 comprising an uncolored paper 11 and a colored paper 12 is used.

As was described above, the present invention is a combination of a support of paper and a specific composition, and can be embodied in various forms. In any of those embodiments, the light-intercepting paper of the invention has an appropriate rigidity and extremely excellent characteristics as a light-intercepting paper for photographic films.

The present invention will be described in greater detail below by refrence to Examples.

EXAMPLES 1–4

Each composition as shown in the following Table was sufficiently kneaded using a resin kneader such as a Banbury mixer, an open roll or the like.

TABLE 1

| Ingredient | Sample (percent by weight) | | | | |
|---|---|---|---|---|---|
| | Comparison | 1 | 2 | 3 | 4 |
| (1) Ethylene ethyl acrylate copolymer [1] | | 22.5 | 45 | 67.5 | 90 |
| (2) polyethylene [2] | 84 | 67.5 | 45 | 22.5 | 0 |
| (3) carbon black [3] | 10 | 10 | 10 | 10 | 10 |
| (4) dispersing agent [4] | 6 | | | | |

[1] As the ingredient (1), "DPD–6169" (trade name, manufactured by the Union Carbide Corp., ethylacrylate content in the copolymer; 16 mol percent: specific gravity; 0.931: melt index=6: and mean molecular weight; believed to be about 30,000 was used.

[2] As the ingredient (2), a high pressure process polyethylene of a laminate grade (specific gravity=0.920; mean molecular weight: 30,000; and melt index: 5.0) was used.

[3] As the ingredient (3), a furnace black of a mean grain size of 20 m$\mu$. was used.

[4] As the ingredient (4), a low molecular weight polyethylene, "Sanwax 161–P" (trade name, manufactured by the Sanyo Chemical Industry Company, Limited: mean molecular weight; 5,000, a density of 0.93, a softening point of 110° C., a visocity of 4,300 cps. (at 140° C.)] was used.

Each of the kneaded compositions thus prepared was applied to a kraft paper having a weight of 75 g./m.$^2$ containing 8% by weight of carbon black in the fiber texture by heat melting extrusion coating in a thickness of $20\mu$ using an extruder. All of the resulting coated materials exhibited complete light-intercepting property. From each sample was prepared a light-intercepting paper for photographic roll films and was wound around a core used for winding the photographic film. The bending rigidity of each light-intercepting paper and the maximum torque for winding-up in loading each assembly of photographic film and the light-intercepting paper (being superposed one on the other) in a camera were measured. The results obtained are given in Table 2. Additionally, the bending rigidity of the light-intercepting paper was measured according to the "stiffness test of paper by load-bending method" provided in JIS P8125 (enacted 1957).

TABLE 2

| Sample | Bending rigidity of light-intercepting paper | Maximum winding-up torque (kg.mm.) |
|---|---|---|
| Comparison | 2.25 | 4.0 |
| 1 | 2.10 | 3.8 |
| 2 | 1.90 | 3.0 |
| 3 | 1.80 | 2.7 |
| 4 | 1.75 | 2.5 |

As is obvious from the results given in Table 2, it was demonstrated that the samples 1–4 in accordance with the invention were smaller in bending rigidity, were more pliable, were smaller in the maximum torque of winding-up, in comparison with the comparative sample, and therefore, the winding-up operation of a photographic film loaded in a camera could be conducted smoothly.

EXAMPLE 5–10

The procedures described in the sample 4 in Example 1 were conducted using the following copolymers in place of the ethyl acrylate-ethylene copolymer.

TABLE 3

| Ex. no. (sample) | Comonomer of copolymer | Copolymerization molar ratio of ester to ethylene | Melt index |
| --- | --- | --- | --- |
| 5 | Ethyl methacrylate | 70:30 | 5.8 |
| 6 | Methyl acrylate | 75:25 | 6.5 |
| 7 | Butyl acrylate | 90:10 | 7.7 |
| 8 | Butyl methacrylate | 85:15 | 6.0 |
| 9 | 2-ethyl-butyl acrylate | 90:10 | 7.0 |
| 10 | 2-ethyl-hexyl acrylate | 92:8 | 7.5 |

The "bending rigidity" and the "maximum torque of winding-up" in loading an assembly of a photographic film and a light-intercepting paper in a camera were measured for the sample of each Example in the same manner as described in Examples 1–4. The results obtained are shown in Table 4.

TABLE 4

| Sample | Bending rigidity | Maximum winding-up torque (kg. mm.) |
| --- | --- | --- |
| 5 | 1.95 | 3.2 |
| 6 | 1.80 | 2.7 |
| 7 | 1.90 | 3.0 |
| 8 | 2.00 | 3.5 |
| 9 | 1.95 | 3.1 |
| 10 | 2.00 | 3.5 |

As is apparent from the results shown in Table 4, in the case of Examples 5–10, the same conclusions could be drawn as in the foregoing Examples 1–4.

While the invention has been described in detail and with reference to specific embodiments thereof, it will be apparent that various changes and modifications can be made therein without departing from the spirit and scope thereof.

What is claimed is:

1. A light-intercepting paper for a photographic film comprising a paper having on at least one side of said paper a light-intercepting layer comprising an effective amount of carbon black dispersed in a copolymer of ethylene and at least one ester selected from the group consisting of acrylic esters, methacrylic esters and mixtures thereof, wherein the alkyl moiety of said esters has from 1 to 8 carbon atoms, and wherein said copolymer has a copolymerization molar ratio of said esters to ethylene of from 5:95 to 40:60.

2. The light-intercepting paper of Claim 1, wherein said carbon black is present in said copolymer at a level ranging from 5 to 50 parts by weight per 100 parts by weight of said copolymer and wherein the thickness of said layer ranges from about $10\mu$ to $40\mu$.

3. The light-intercepting paper of Claim 1, wherein said ester is methyl acrylate, ethyl acrylate, n-propyl acrylate, iso-propyl acrylate, n-butyl acrylate, iso-butyl acrylate, n-hexyl acrylate, 2-ethylhexyl acrylate, n-octyl acrylate, methyl methacrylate, ethyl methacrylate, n-propyl methacrylate, isopropyl methacrylate, n-butyl methacrylate, iso-butyl methacrylate, n-hexyl methacrylate, 2-ethylhexyl methacrylate, or n-octyl methacrylate.

4. The light-intercepting paper of Claim 1, wherein said paper additionally comprises an adhesive layer between said paper and said light-intercepting layer.

References Cited

UNITED STATES PATENTS

| | | | |
| --- | --- | --- | --- |
| 3,306,766 | 2/1967 | Hathaway et al. | 117—76 P |
| 3,524,759 | 8/1970 | McConnell et al. | 117—155 UA X |
| 3,514,290 | 5/1970 | Van Hoof | 117—155 UA X |
| 3,660,153 | 5/1972 | Seto | 96—85 X |
| 3,582,339 | 6/1971 | Martens et al. | 117—76 P X |

FOREIGN PATENTS

| | | | |
| --- | --- | --- | --- |
| 1,449,852 | 2/1966 | France | 96—85 |

RALPH HUSACK, Primary Examiner

U.S. Cl. X.R.

96—78, 84 R, 85; 117—45, 155 UA